Dec. 26, 1967  A. C. DAMSKE  3,360,086
MEANS TO CONVERT MECHANICAL ENERGY INTO HEAT
ENERGY IN A SHOCK ABSORBER
Filed April 12, 1966
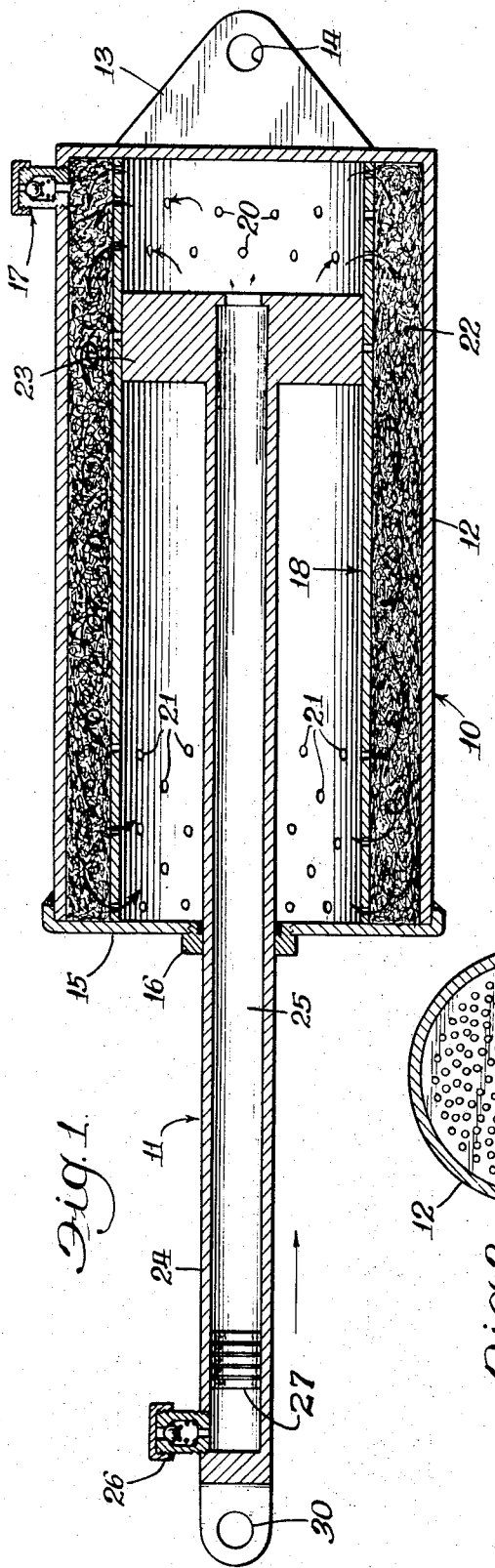
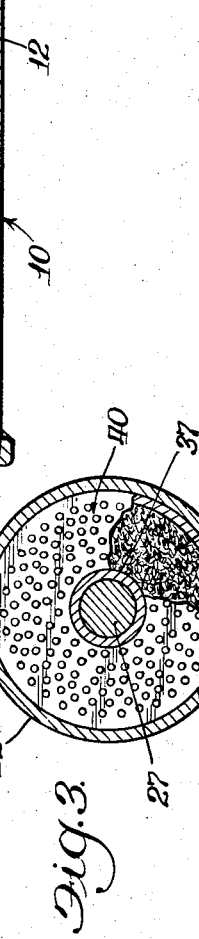
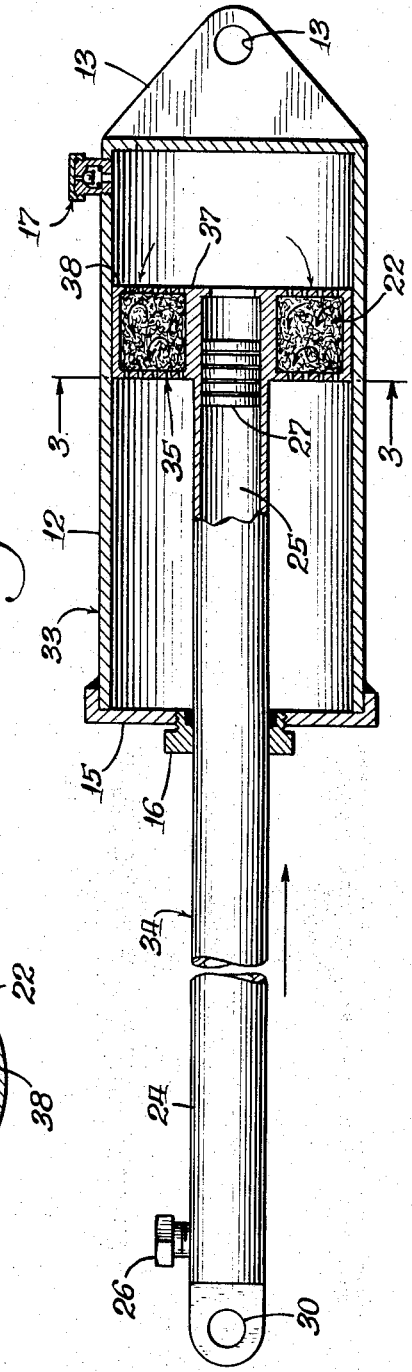
Inventor:
Albert C. Damske
By Snow and Benno
Attys.

United States Patent Office 3,360,086
Patented Dec. 26, 1967

3,360,086
MEANS TO CONVERT MECHANICAL ENERGY INTO HEAT ENERGY IN A SHOCK ABSORBER
Albert C. Damske, Rte. 3, Box 723,
Antioch, Ill. 60002
Filed Apr. 12, 1966, Ser. No. 542,108
2 Claims. (Cl. 188—97)

ABSTRACT OF THE DISCLOSURE

The invention comprises a fluid type shock absorber using porous or sieve-like material exclusively to convert the mechanical shock energy into heat energy.

---

This invention relates generally to shock absorbers, and more particularly to a novel fluid shock absorber construction.

The primary object of the present invention is to provide a unique construction for a fluid type shock absorber in which mechanical energy is quickly and efficiently dissipated through conversion into heat energy.

It is a further object of the invention to provide an arrangement for a shock absorber such as described in the preceding paragraph in which the construction is simple, sturdy, and efficient.

It is a further object of the invention to provide a novel construction which will permit the shock absorber arrangement of the preceding paragraphs to be made in many different sizes and capacities for many different applications.

It is still another object to provide a novel arrangement for a fluid type shock absorber in which the mechanical energy is efficiently converted into heat through the formation of a great number of eddy currents in the fluid of the shock absorber.

Other objects and features of the invention will be apparent upon a perusal of the following specification and drawing in which:

FIGURE 1 is a cross sectional view of one embodiment of the invention;

FIGURE 2 is a cross sectional view similar to FIGURE 1 but showing another embodiment of the invention; and FIGURE 3 is a cross sectional view of the structure shown in FIGURE 2 and taken substantially along the line 3—3 of FIGURE 2.

The present embodiments are the preferred embodiments, but it is to be understood that changes can be made in the present embodiments by one skilled in the art without departing from the spirit and scope of the present invention.

Generally, the invention comprises the production of a sealed cylinder with a piston slidably carried therein and connected to a piston rod extending outwardly of the cylinder. Mechanical energy is applied to the construction between the cylinder and the piston rod. The piston rod internally includes means for preventing hydraulic locking of the arrangement. The interior of the cylinder is completely filled with fluid. A certain porous material is provided in the cylinder and certain passageways are arranged relative to the porous material so that the mechanical energy applied to the shock absorber causes the fluid in the cylinder on one side of the piston head to be forced through the porous material to the other side of the piston head. In one embodiment of the invention the porous material is disposed in a chamber concentrically arranged about the piston head. In another embodiment of the invention the porous material is disposed within the piston head. The porous material is selected so that the hydraulic fluid in being forced through the porous material is continuously caused to change direction and thereby is directed into eddy currents which because of friction causes the mechanical energy to be converted into heat energy. The porous material may take various forms, it may be either metallic or non-metallic in composition. In shape, it may be mesh, ball, pellet, granular or wool-like. In some instances when it is of a wool-like shape it may be necessary that the material be under high compression so that the passageways through the material are small enough and arranged to provide for good eddy current production to convert the mechanical energy into heat energy.

In detail, the first embodiment which is shown in FIGURE 1, comprises a cylinder assembly 10 and a piston and rod assembly 11. The cylinder assembly 10 comprises an outer cylinder 12, the head end of which is closed. That end carries a flange 13 which is provided with an opening 14 therethrough for connection of the head end of the assembly in a shock receiving arrangement. The general configuration of the parts is shown merely by way of example, and it should be understood that certain specific sizes, capacities, or connecting arrangements may be provided in any device requiring the use of a shock absorber. The rod end of the cylinder 12 is covered by a cap member 15. The center of the cap member 15 is provided with a piston rod sealing assembly 16 which seals the cylinder arrangement 10 against any fluid leaking out of the cylinder and from any entrance of dirt into the cylinder.

The cylinder arrangement 10 further includes a valve assembly 17 for filling the shock absorber with fluid.

In the first embodiment of the invention in FIGURE 1, a second or inner cylinder 18 is provided and concentrically arranged within the outer cylinder 12. The periphery of the head end of the inner cylinder 18 is provided with a plurality of holes 20 and the periphery of the rod end of the inner cylinder 18 is provided with a plurality of holes 21. The number, size, and pattern of distribution of the holes 20 and 21 may be varied in accordance with the fluid shock absorber action required in any particular assembly. Any fluid flowing between the inner cylinder 18 and the space defined by the inner cylinder 18 and the outer cylinder 12 will pass through the holes 20 and 21.

The space between the inner cylinder 18 and the outer cylinder 12 is filled or otherwise occupied by the restrictively porous material 22. Whether or not the material 22 completely fills the space between the cylinders 18 and 12, it must be so arranged that any fluid passing through the space between the cylinders 18 and 12 must pass through the material 22 and not have available any less restricted route or passageway. The material 22 must be so physically constituted that it causes any fluid attempting to pass therethrough to be continuously directed into countless eddy currents. A proper direction of the force of fluid flow into eddy currents results in the conversion of the force of fluid flow, to a very large degree, into heat energy. It is contemplated that the material 22 can in composition be either metallic or non-metallic. The restrictively porous material must be such as to produce a sufficiently restrictive path to fluid forced therethrough to insure the adequate production of sufficient eddy currents to effectively convert most of the forced fluid flow through frictional contact into heat energy.

The shock absorber of the first embodiment of the invention further is provided with a piston and rod assembly 11 in which the piston head 23 is a fluid impervious member. The piston rod 24 which is connected at one end thereof to the piston head 23 is hollow so that the interior of piston rod 24 defines a chamber 25. The chamber 25 extends through the piston head 23 to open into the head end of the inner cylinder 18. The other end of the chamber 25 is closed by a valve assembly 26. The chamber 25 is further provided with a free piston 27. The chamber 25 and the piston 27 in the piston rod 24 function as an accummulator to provide for the volumetric displacement of the piston rod 24 as the piston head 23 is moved in either direction within the inner cylinder 18. Gas under pressure is delivered to the chamber 25 through the valve assembly 26, and that gas will urge the piston 27 toward the piston head 23.

The outer end of the rod 24 is provided with an opening 30 for connection of the shock absorber in a shock absorbing arrangement. Thus in any shock absorbing arrangement the shock force which is to be absorbed is applied between the end of the piston rod assembly 11 with the hole 30 and the flange 13 with its hole 14.

The construction of the first embodiment shown in FIGURE 1 is completed with the application of fluid through the valve 17 to completely fill the inner cylinder 18 on both sides of the piston head 23 and the entire space between the inner cylinder 18 and the outer cylinder 12.

From the foregoing it may be seen that as mechanical forces are applied to the shock absorber, the piston head 23 will force fluid from either the head or rod end of the inner cylinder 18, depending upon the direction of the applied force, and correspondingly through either holes 20 or 21. The fluid will then pass through the material 22 between the inner cylinder 18 and the outer cylinder 12 and then back into the inner cylinder 18 at the end opposite from that which the fluid was forced. In passing through the material 22, the fluid is directed into countless eddy currents which because of the frictional contact with that material will be converted into heat energy. The heat energy may be radiated or otherwise conducted from the outer cylinder 10 to effectively permit continuous operation of the shock absorber.

The second embodiment of the invention is shown in FIGURES 2 and 3 and the parts thereof which are similar to those of FIGURE 1 are identically numbered. Again, the shock absorber comprises a cylinder arrangement 33 and a piston arrangement 34. The cylinder arrangement 33 comprises a cylinder 12, the closed head end of which is provided with a flange 13 having a hole 14 therethrough for connection in a shock absorbing arrangement. The head end of the cylinder 12 is also provided with a valve assembly 17 for filling the cylinder 12 with fluid. The rod end of the cylinder 12 is covered by a cap member 15 and the cap member 15 carries a seal assembly 16 which extends about the piston assembly 34.

The piston assembly 34 comprises a piston rod 24 which at one end is secured to a piston 35. The piston rod 24 is hollow to define a chamber 25 therein, and a valve assembly 26 is provided at the outer end of the rod 24 for filling the chamber 25 with gas under pressure. The outer end of the piston rod 24 is also provided with a hole 30 for connection of the shock absorber assembly in a shock receiving arrangement. The head end of the chamber 25 carries a free piston 27. The side of the piston 27 away from the chamber 25 opens into the head end of the cylinder 12 so that the chamber 25 and the piston 27 in the piston rod 24 function as an accumulator to allow for the volumetric displacement of the piston rod as the piston assembly 34 is moved inwardly and outwardly of the cylinder arrangement 33.

As opposed to the arrangement of concentric cylinders of the first embodiment, the second embodiment is provided with a piston head 35 which is restrictively porous. The cylinder head 35 comprises two concentric rings, an inner ring 37 and an outer ring 38 interconnected by means such as end plates 40. The outer diameter of the outer ring 38 is substantially equal to the inner diameter of the cylinder 12. The end plates 40 are circular disks having many small holes therethrough for fluid passage. The space between the plates 40 is filled with the material 22 which, as in the first embodiment, causes fluid passing therethrough to be directed into countless eddy currents. The eddy currents cause the conversion of mechanical energy into heat energy. Filling the interior of the cylinder 12 with fluid through the valve 17 completes the construction of the second embodiment.

Having described the invention what is considered new and desired to be protected by Letters Patent is:

1. In a shock absorber, a reciprocating piston and cylinder assembly, fluid filling said cylinder on both sides of said piston, said shock absorber having fluid passageway means communicating with both sides of said piston, and restrictively porous means positioned in at least a portion of said fluid passageway means so that any fluid moved from one side of said piston to the other responsive to movement of said piston relative to said cylinder passes through said restrictively porous means, said porous means being formed so that a substantial portion of any fluid passing therethrough is directed into countless eddy currents which cause the force of the fluid movement to be substantially converted into heat energy, wherein said piston and cylinder assembly and said passageway means comprise, a pair of concentric cylinders, said piston being slidably carried in the inner cylinder of said pair of concentric cylinders, said pair of concentric cylinders having opening means between said cylinders at both ends thereof, and said restrictively porous means carried between said pair of concentric cylinders so that fluid flows through said porous means responsive to sliding movement of said piston relative to said cylinder.

2. In a shock absorber as defined in claim 1, wherein said openings comprise a plurality of holes formed through said inner cylinder in certain spaced apart patterns circumferentially about the end portions of each end of said inner cylinder.

References Cited
UNITED STATES PATENTS

| 2,744,587 | 5/1956 | Beck. |
| 2,819,064 | 1/1958 | Perus _____ 188—100 X |
| 3,302,756 | 2/1967 | McIntyre _____ 188—88 |

FOREIGN PATENTS

| 1,036,073 | 8/1958 | Germany. |

MILTON BUCHLER, *Primary Examiner.*

G. E. HALVOSA, *Assistant Examiner.*